(No Model.) 5 Sheets—Sheet 1.

J. H. DALE.
MACHINE FOR MAKING COMBINED ENVELOPES AND NOTE SHEETS.

No. 512,505. Patented Jan. 9, 1894.

WITNESSES:
C. E. Ashley
Charles Schroeder

INVENTOR
J. H. Dale
BY Goepel & Raegener
ATTORNEYS.

(No Model.) 5 Sheets—Sheet 3.
J. H. DALE.
MACHINE FOR MAKING COMBINED ENVELOPES AND NOTE SHEETS.
No. 512,505. Patented Jan. 9, 1894.

WITNESSES:
C. E. Ashley
Charles Schroeder

INVENTOR
J. H. Dale
BY Goepel & Raegener
ATTORNEYS.

(No Model.) 5 Sheets—Sheet 4.
J. H. DALE.
MACHINE FOR MAKING COMBINED ENVELOPES AND NOTE SHEETS.
No. 512,505. Patented Jan. 9, 1894.
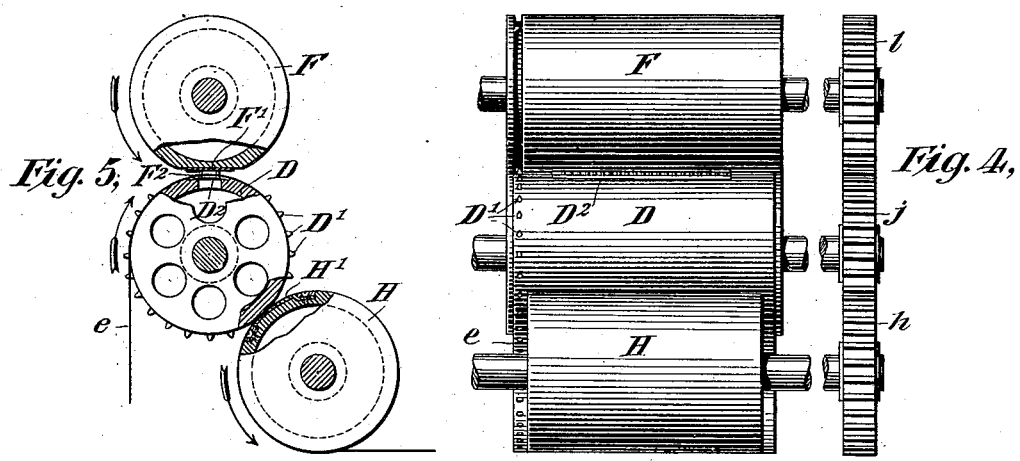
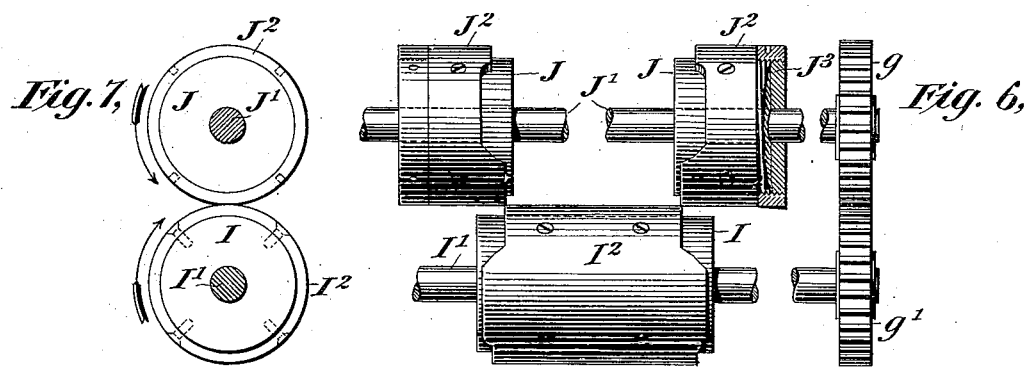
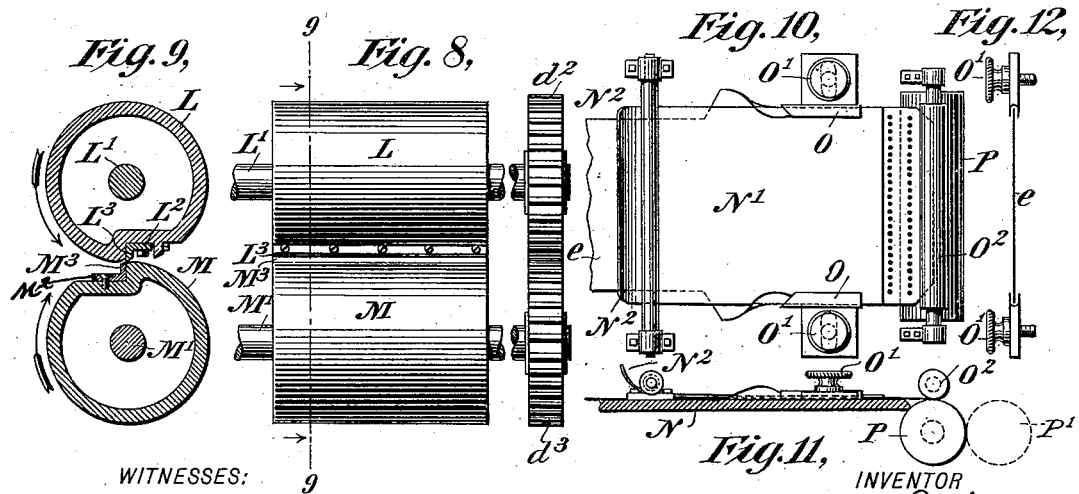
WITNESSES:
C. E. Ashley
Charles Schroeder
INVENTOR
J. H. Dale
BY Goepel & Raegener
ATTORNEYS.

(No Model.) 5 Sheets—Sheet 5.
J. H. DALE.
MACHINE FOR MAKING COMBINED ENVELOPES AND NOTE SHEETS.
No. 512,505. Patented Jan. 9, 1894.
Fig. 13,
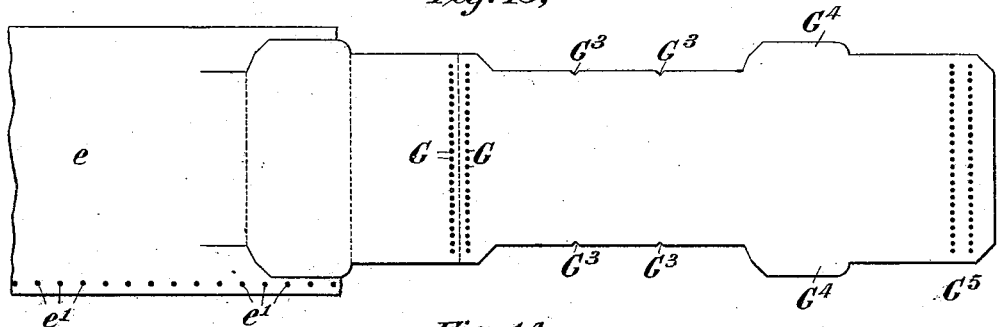
Fig. 14,
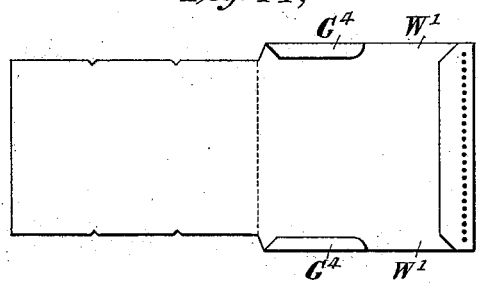
Fig. 15,
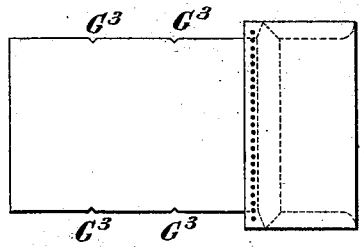
Fig. 16.
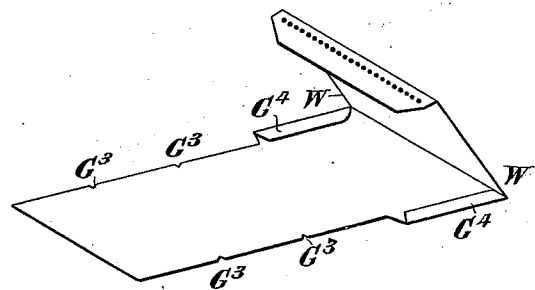
WITNESSES:
C. E. Ashley
Charles Schroeder
INVENTOR
J. H. Dale
BY Gifel Raegener
ATTORNEYS.

UNITED STATES PATENT OFFICE.

JOHN H. DALE, OF NEW YORK, N. Y., ASSIGNOR TO PETER B. SWEENY, OF SAME PLACE.

MACHINE FOR MAKING A COMBINED ENVELOPE AND NOTE-SHEET.

SPECIFICATION forming part of Letters Patent No. 512,505, dated January 9, 1894.

Application filed May 2, 1893. Serial No. 472,691. (No model.)

*To all whom it may concern:*

Be it known that I, JOHN H. DALE, a citizen of the United States, residing in the city, county, and State of New York, have invented certain new and useful Improvements in Machines for Making a Combined Envelope and Note-Sheet, of which the following is a specification.

This invention relates to a new and improved machine for making a combination envelope and note-sheet; and the object of my invention is to provide a new and improved machine which takes the printed and gummed paper, perforates the same, cuts it to the proper shape, folds it, pastes it and delivers the completed envelopes.

Figure 1:
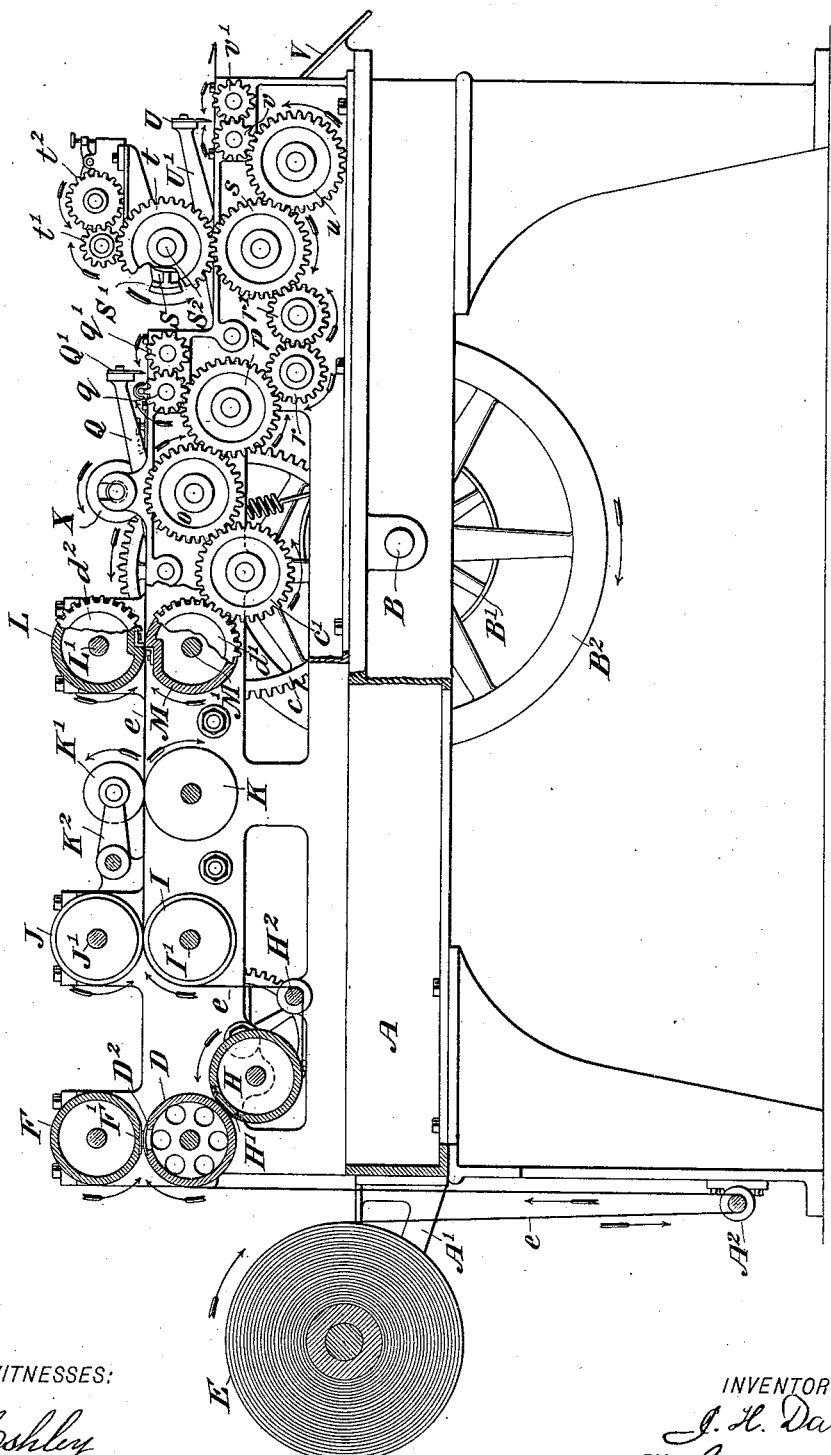
Figure 2:
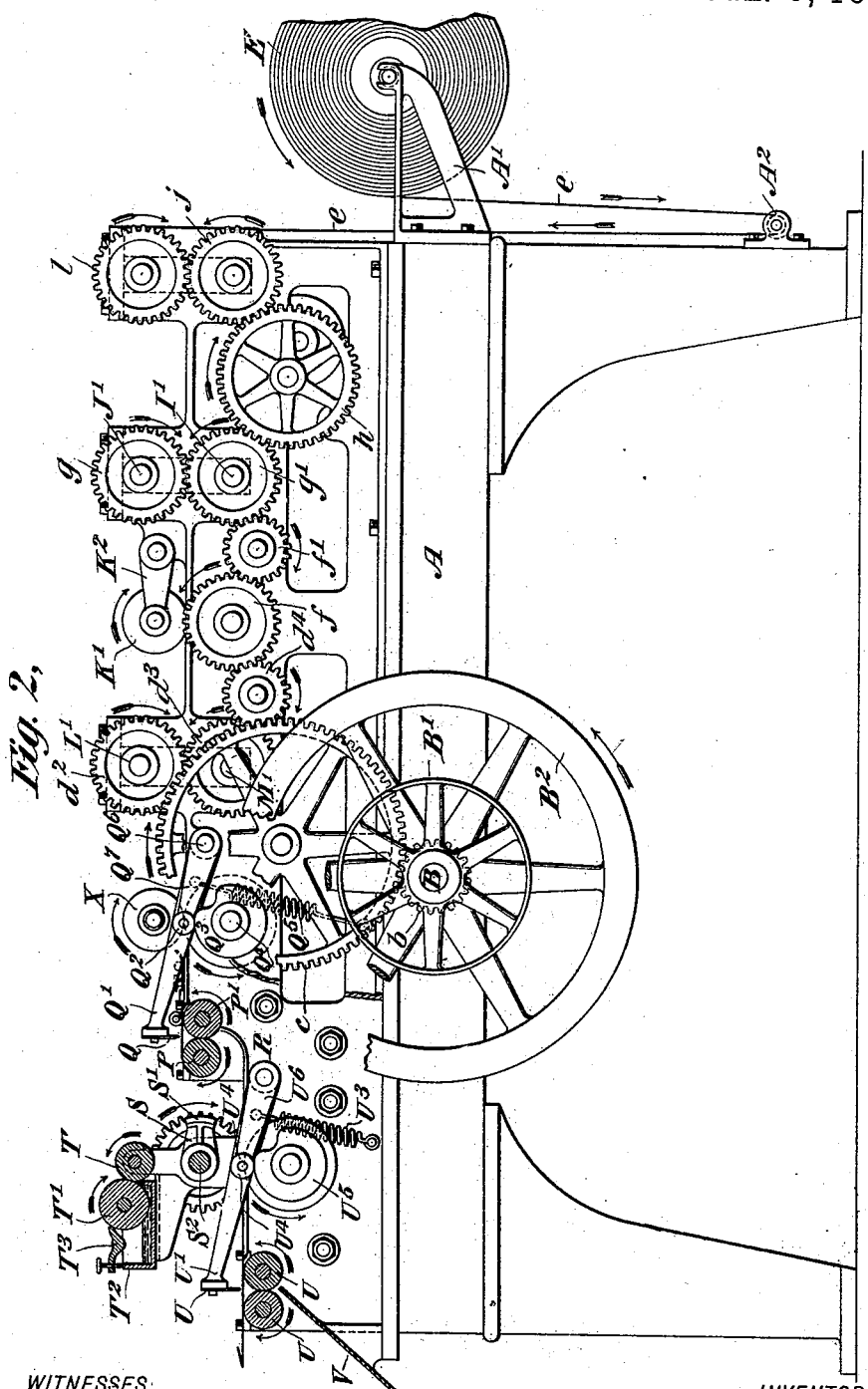
Figure 3:
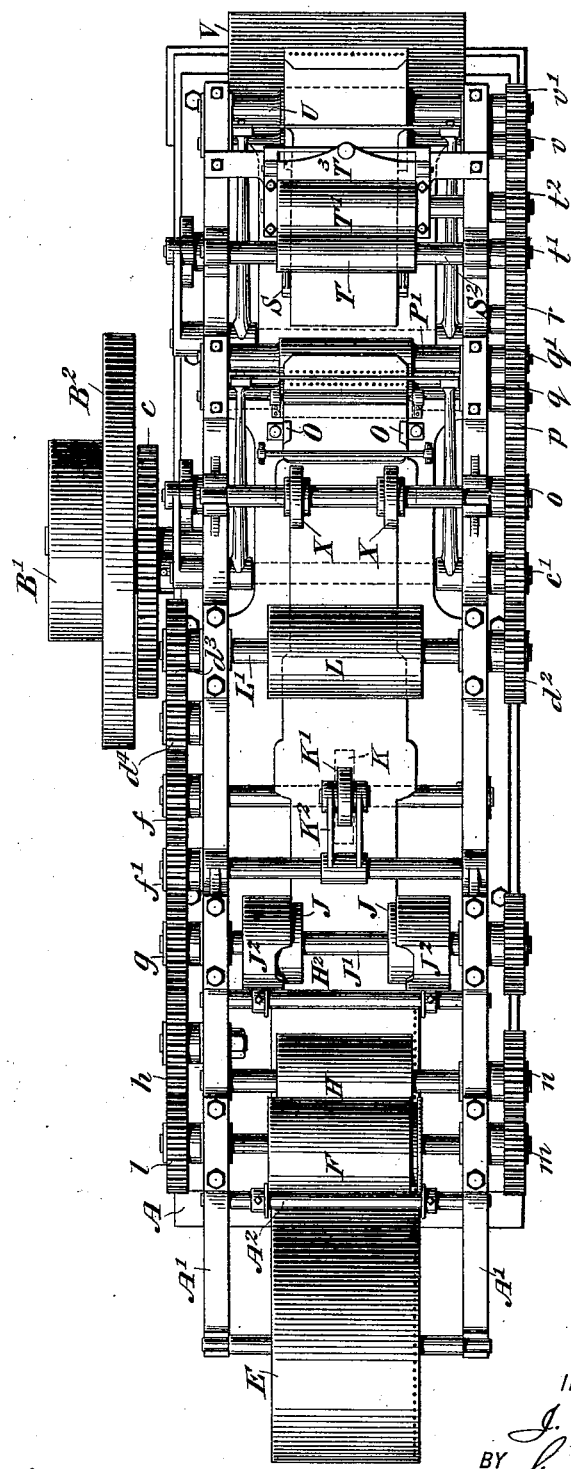

In the accompanying drawings, Figure 1 is an elevation of one side of my improved machine for making a combined envelope and note-sheet, one-half of the figure being shown in longitudinal section and parts broken out. Fig. 2, is an elevation of the other side of the machine, in which that part is shown in elevation in Fig. 1 is now shown in vertical longitudinal section, parts being broken out. Fig. 3, is a plan-view of the machine. Fig. 4, is an elevation of the perforating and drawing rollers, parts being broken out. Fig. 5, is an end elevation of the same, parts being broken out and others in section. Fig. 6, is an elevation of the cutting rollers. Fig. 7, is an end-elevation of the same, the shafts being in section. Fig. 8, is an elevation of the rollers for making the transverse cut. Fig. 9, is a vertical transverse sectional view of the same on the line 9 9, of Fig. 8. Fig. 10, is a plan-view of the side-edge folding mechanism. Fig. 11, is a vertical longitudinal sectional view of the same. Fig. 12, is a vertical transverse sectional view of the came. Fig. 13, is a plan-view of one of the strips of paper and one of the blanks cut from the same. Fig. 14, is a plan-view of one of the blanks having the perforated end folded. Fig. 15, is a plan view of one of the blanks, showing the same folded as it is delivered by the machine, and Fig. 16, is a perspective view of one of the blanks, showing the addressing flap raised and the gumming flap folded over.

Similar letters of reference indicate corresponding parts.

In the frame A, the main driving-shaft B is mounted and carries at one end the belt-pulley B' and the fly-wheel B². A pinion $b$ on said main driving shaft B engages the cog-wheel $c$ on the shaft C mounted transversely in the frame of the machine. From said shaft C all the other parts are driven in a manner that will be described hereinafter. A roll of paper E with its tubular core is mounted on a suitable spindle supported by brackets A' at one end of the frame A, and from said roll E the paper strip $e$ passes down to and under a guide-roller A² at the bottom of one end of the frame A and then passes upward and over a roller D, which is provided at one end, on its circumferential surface with a series of pins D' arranged equi-distant from each other and adapted to pass into equi-distant apertures $e'$ in one edge of the strip of paper $e$ so that the strip of paper is conducted and guided in a regular fixed order on said roller D. Above the roller D a roller F is mounted parallel therewith, said roller F having a flattened portion F', from which two parallel rows of male perforating punches F² project. The roller D contains the female perforating dies D² corresponding to the punches F². As the paper strip passes over the roller D two lines G of perforations are produced transversely across the strip at regular intervals. From the roller D the paper passes under a roller H parallel with the rollers F and D, in the circumference of which roller H a pad H' of felt, rubber or like material is held. The pad or cushion H' exerts a certain pressure on the strip of paper and holds the same, thus preventing the strip from sticking to the male perforating punches of the roller F and being drawn upward by the same. The rollers F and H are all of the same diameter and the rollers D and F are driven at the same speed. From the roller H the paper passes under the guide-roller H² parallel with said roller H and a short distance in front of the same and then passes upward between the male cutting roller I and the female cutting-roller J, which rollers are mounted on the shafts I' and J' respectively. The male cutting roller I carries a steel sleeve I² which is held in place by suitable screws and the ends of which have contours corresponding to those that the completed sheet is to have. The two female cutting-rollers J each carry a sleeve J² fastened by screws, the inner edges of which also correspond to the contour desired for the sheets and match the end contours of the sleeve I² on the roller I'. So as to permit of adjusting the female dies properly in relation to the male dies, they are provided with nuts J³ fixed on the shaft J', so that by turning the hubs J on the shaft the nuts act on the same in such a manner as to cause said hubs to move toward or from each other. Said rotary shears or cutters cut the strips longitudinally, so as to give them the proper contour, as shown in Fig. 13, that is, to provide them with the notches G³, and the wings G⁴, for a purpose that will be set forth hereinafter. The strip of paper then passes over a guide-roller K, on which it is pressed by a roller K' that is mounted in the arms K² pivoted on the top of the frame A, and which roller K' acts to keep the strip of paper straight. The strip then passes between two transverse cutting-rollers L and M mounted on the shaft L' and M' respectively, which rollers L and M each are provided with a longitudinal offset L² and M², in which the cutting blades L³ and M³ are held, which cutting-blades cut off the strip on a transverse line having angular offsets at the ends, as shown in Fig. 13. The sheet for each combined envelope and note sheet is now detached and passes from the transverse cutting-rollers upon the table N and under a plate N' held directly above said table and having an upturned end N², which plate N' is of less width than the sheet at the wings G⁴. At the side edges of said plate N' U-shaped folding clips O are arranged, which embrace parts of the edges of the plate N' and are provided for the purpose of folding over the wings G⁴ as they pass said clips and bring them from the position shown in Fig. 13 into the position shown in Fig. 14. The folding clips O can readily be adjusted by means of the binding screws O', so as to be in proper position in relation to the moving sheet and the plate N'. The sheet then passes under the pressure roller O² and upon the two folding rollers P P' rotating toward each other as shown in Fig. 2. Directly above the line of contact of said folding rollers a folding-knife Q is arranged which is attached to two arms Q' of the rocking shaft Q⁶ having the end arm Q⁷ provided with the anti-friction roller Q², which anti-friction roller runs on a cam Q³ fixed on the end of a transverse shaft Q⁴ in the frame A. A spring Q⁵ connected with the arm Q⁷ and with the frame of the machine throws said arms Q' and the folding knife Q downward when the roller Q² arrives at the notch of the cams Q³.

The machine is so geared that when a point midway between the two lines of perforations G G is directly above the line of contact of the rollers P P' the folding knife Q descends and presses down the paper between the said two lines of perforations and feeds the sheet to the folding rollers which fold the end of the sheet between said line of perforations. The sheet thus folded then passes down the curved end of a table R and travels along the upper surface of said table and is provided on the upper surfaces of the folded wings G⁴ with mucilage by wipers S' attached to arms S on a shaft S², which wipers obtain their mucilage from a roller T, which is in contact with a roller T' arranged in a mucilage receptacle T² provided with an adjustable doctor T³ for scraping off the surplus mucilage. Every time the wiper arms S make a revolution, their wipers come in contact with the roller T and receive sufficient mucilage to gum the upper edges of the wings G⁴. The sheet, which is now folded, as shown in Fig. 14, and has the upper surfaces of the folded wings G⁴ gummed, travels along the table R, and when the transverse line indicated by the line W W in Fig. 16 arrives above the line of contact of two folding rollers U U a folding knife U' attached to arms U² is moved downward by the action of a spring U³ which spring presses an anti-friction roller U⁴ on the arms U⁶ against the rim of a notched cam U⁵, so that at the proper time the folding-knife U' is moved downward and folds the sheet, which is then drawn down in between the two folding rollers U and completely folded, so as to press the parts W' (Fig. 4) against the gummed wings G⁴, whereby said parts W' are pasted to said wings G⁴ and the completed envelope and note-sheet is formed, which then drops upon the inclined plate V and slides down the same into a suitable receptacle.

Fig. 16 shows the end parts of the sheet detached for the purpose of better illustration.

Motion is transmitted from the shaft C by means of the cog-wheel $c'$ Fig. 1 to the cog-wheel $d'$ on end of the shaft M' of the lower transverse cutter-roller U and from said cog-wheel $d'$ to the cog-wheel $d^2$ on one end of the shaft L' of the upper transverse cutter-roller, L which cog-wheels are arranged at one side of the machine. At the opposite side of the machine motion is transmitted from the cog-wheel $d^3$ on the shaft M' of the lower transverse cutter by means of the idle-wheel $d^4$ to the cog-wheel $f$ on the shaft of the evening roller K and from said cog-wheel $f$ by means of the idle-wheel $f'$ to the cog-wheel $g'$ on one end of the shaft I' of the male longitudinal cutting die; and from said cog-wheel $g$ to the cog-wheel $g'$ on the end of shaft J' of the female longitudinal cutting die; motion is transmitted from the cog-wheel $g$ through the idle-wheel $h$ to the cog-wheel $j$ on one end of the shaft of the perforating roller D and from said cog-wheel $j$ to the cog-wheel $l$ on the shaft of the punch-roller F. Said rollers F and D have cog-wheels on each end of the shafts, as do also the transverse shafts of the longitudinal cutting dies J and I. Motion is transmitted to the roller H from the cog-wheel $m$ on one end of the shaft of the cylinder D to the cog-wheel $n$ on the corresponding end of the shaft of the roller H. Motion is transmitted from the cog-wheel $c'$ to the cog-wheel $o$ on the shaft $Q^4$ carrying the cam $Q^3$, and by means of the idle wheel $p$ motion is transmitted from the cog-wheel $o$ to the wheels $q$ $q'$ of the folding rollers P and P'. From the cog-wheel $p$ motion is transmitted by means of the two idle-wheels $r$ $r'$ to the cog-wheel $s$ on the end of the shaft carrying the cam $U^5$, and from said cog-wheel motion is transmitted directly to the cog-wheel $t$ on the shaft $S^2$ carrying the wiper-arms S; and by means of the cog-wheels $t'$ $t^2$ motion is transmitted to the rollers T T'. From the cog-wheel S motion is transmitted by means of the idle-wheel $u$ to the cog-wheels $v$ $v'$ on the folding rollers U U. The rollers X run loosely on the strips and serve to hold them in place while they are being cut off transversely and to guide them under the plate N' on the table N.

All kinds of envelopes can be made on this machine with slight modifications.

Having thus described my invention, I claim as new and desire to secure by Letters Patent—

1. The combination with a frame, of a pair of rollers, having a longitudinal row of perforating punches and dies, cutting rollers for cutting the edges of a strip of paper, a set of rollers for cutting the paper transversely to its length, a vertically movable folding knife, a pair of rollers below the vertically movable knife, in between which rollers the knife presses the paper, a set of folding clips for folding the edges of the sheets, a set of wipers for gumming the edges of the sheets and a second vertically movable knife and a pair of rollers below the same, for folding the pasted strips, substantially as set forth.

2. The combination with a frame, of a pair of rollers having a row of perforating punches and dies parallel with the axis of the rollers, a set of rollers having male and female dies for cutting the edges of sheets, a pair of rollers having knives for cutting the sheets transversely, a table on which the sheet is conducted after being cut transversely, clips for folding the side edges of the sheets on said table, a pair of folding rollers at the end of the table, a vertically movable folding knife above said folding rollers, rotary wipers for applying mucilage, means for providing the wipers with mucilage and an additional vertically movable folding knife and a pair of folding rollers below the same, substantially as set forth.

3. The combination with a pair of rollers, of which one is provided with a row of female perforating dies parallel with the axis and the other with a row of male punches parallel with the axis, and a third roller provided on its circumference with a pad and in contact with the roller having the longitudinal row of female dies and rollers for cutting the paper longitudinally and transversely and folding it, substantially as set forth.

4. The combination with a frame of a pair of rollers of which one is provided with a longitudinal row of female dies and the other with a row of male punches, one of said perforating rollers being provided at its end with an annular row of projections, means on said frame for cutting the edges of paper, means for cutting the paper transversely, means for folding the edges of the sheets, means for gumming the folded edges and means for folding the gummed sheets produced, substantially as set forth.

In testimony that I claim the foregoing as my invention I have signed my name in presence of two subscribing witnesses.

JOHN H. DALE.

Witnesses:
OSCAR F. GUNZ,
CHARLES SCHROEDER.